(12) United States Patent
Postelnik et al.

(10) Patent No.: US 10,252,134 B2
(45) Date of Patent: Apr. 9, 2019

(54) PADDLE LINK—REAL TIME PADDLING PERFORMANCE

(71) Applicants: Eyal Postelnik, Marietta, GA (US); Guy Aharon, Herzlia (IL); Sivan Postelnik, Marietta, GA (US)

(72) Inventors: Eyal Postelnik, Marietta, GA (US); Guy Aharon, Herzlia (IL); Sivan Postelnik, Marietta, GA (US)

( * ) Notice: Subject to any disclaimer, the term of this patent is extended or adjusted under 35 U.S.C. 154(b) by 702 days.

(21) Appl. No.: 14/362,984

(22) PCT Filed: Dec. 3, 2012

(86) PCT No.: PCT/IL2012/050500
§ 371 (c)(1),
(2) Date: Jun. 5, 2014

(87) PCT Pub. No.: WO2013/084230
PCT Pub. Date: Jun. 13, 2013

(65) Prior Publication Data
US 2015/0032410 A1  Jan. 29, 2015

Related U.S. Application Data

(60) Provisional application No. 61/566,717, filed on Dec. 5, 2011.

(51) Int. Cl.
  *G09B 9/06* (2006.01)
  *A63B 69/06* (2006.01)
  *G01P 15/18* (2013.01)
  *G09B 19/00* (2006.01)
(52) U.S. Cl.
  CPC .............. *A63B 69/06* (2013.01); *G01P 15/18* (2013.01); *G09B 9/06* (2013.01); *G09B 19/0038* (2013.01); *A63B 2069/068* (2013.01); *A63B 2220/12* (2013.01); *A63B 2220/13* (2013.01); *A63B 2220/17* (2013.01); *A63B 2220/31* (2013.01);
(Continued)

(58) Field of Classification Search
  CPC .... A63B 69/06; A63B 2069/068; G01P 15/18
  USPC ........................................................ 702/153
  See application file for complete search history.

(56) References Cited

U.S. PATENT DOCUMENTS 4,984,986 A * 1/1991 Vohnout ................ A63B 24/00
                                                                  434/247
5,099,689 A    3/1992 McGinn
6,980,118 B2  12/2005 Buvac
(Continued)

FOREIGN PATENT DOCUMENTS

BG            64134 B      1/2004
DE         4212223        11/1992
(Continued)

OTHER PUBLICATIONS

Communication Pursuant to Article 94(3) EPC dated Apr. 1, 2016 From the European Patent Office Re. Application No. 12854919.3.
(Continued)

*Primary Examiner* — Stephanie E Bloss

(57) ABSTRACT

A method and system are disclosed using a position sensor for tracking a trajectory of a paddling instrument. Optionally the trajectory may be used for determining a paddling improvement strategy, for recognizing a stroke type, for coordinating a rowing team and/or for calculating a paddling force.

29 Claims, 7 Drawing Sheets

(52) U.S. Cl.
CPC ... *A63B 2220/803* (2013.01); *A63B 2220/833* (2013.01); *A63B 2225/50* (2013.01)

(56) References Cited

U.S. PATENT DOCUMENTS

| | | | |
|---|---|---|---|
| 7,114,398 B2 | 10/2006 | Haines | |
| 7,207,853 B2 | 4/2007 | Spencert et al. | |
| 7,272,499 B2 * | 9/2007 | Grenfell | A63B 24/0021 701/25 |
| 7,715,982 B2 | 5/2010 | Grenfell et al. | |
| 8,284,070 B2 * | 10/2012 | Chaudhari | G01C 9/00 340/573.1 |
| 2003/0200802 A1 | 10/2003 | Buvac | |
| 2004/0219498 A1 | 11/2004 | Davidson | |
| 2005/0085348 A1 * | 4/2005 | Kiefer | A63B 22/0076 482/72 |
| 2005/0085349 A1 * | 4/2005 | Dandy | A63B 22/20 482/74 |
| 2005/0170711 A1 * | 8/2005 | Spencer | B63B 35/71 440/21 |
| 2005/0215870 A1 * | 9/2005 | Rademaker | A61B 5/00 600/301 |
| 2006/0116037 A1 | 6/2006 | Squires | |
| 2008/0046179 A1 * | 2/2008 | Mackintosh | A63B 24/0021 701/468 |
| 2008/0242521 A1 | 10/2008 | Einav | |
| 2010/0167606 A1 * | 7/2010 | Luecker | A61B 5/224 440/101 |
| 2011/0003664 A1 | 1/2011 | Richard | |
| 2011/0087446 A1 | 4/2011 | Redmond et al. | |
| 2011/0197157 A1 | 8/2011 | Hoffman et al. | |
| 2013/0095711 A1 * | 4/2013 | Rubbo | B63H 16/04 440/2 |

FOREIGN PATENT DOCUMENTS

| | | |
|---|---|---|
| GB | 2414195 | 11/2005 |
| JP | 54-086385 | 7/1979 |
| RU | 2267341 | 1/2006 |
| WO | WO 2008/106748 | 9/2008 |
| WO | WO 2013/084230 | 6/2013 |

OTHER PUBLICATIONS

CKR "Canoe & Kayak Racing", Bimonthly Magazine, XP055260027, 32 P., Mar./Apr. 2010.
Germon "Excalibur", The New Inventors, WayBackMachine, Internet Archive, XP055260022, 3 P., Jun. 7, 2008.
Supplementary European Search Report and the European Search Opinion dated Jul. 22, 2015 From the European Patent Office Re. Application No. 12854919.3.
Gomes et al. "Analysis of the On-Water Paddling Force Profile of an Elite Kayaker", Portuguese Journal of Sport Sciences, Biomechanics in Sports 29(11, Supp.2): 259-262, 2011.
Sturm et al. "A Wireless, Unobtrusive Kayak Sensor Network Enabling Feedback Solutions", International Conference on Body Sensor Networks (BSN): 159-163 , Jun. 7-9, 2010.
International Preliminary Report on Patentability dated Jun. 19, 2014 From the International Bureau of WIPO Re. Application No. PCT/IL2012/050500.
International Search Report and the Written Opinion dated Mar. 19, 2013 From the International Searching Authority Re. Application No. PCT/IL2012/050500.
BioRow "The System, Which Can Measure Everything in Rowing!", BioRowTel® Data Acquisition System, Rowing Biomechanics Newsletter, 2011.
Collins et al. "The Development of Low Cost Sensor Technology to Provide Augmented Feedback for On-Water Rowing", ISBS—Conference Proceedings Archive, 27th International Conference on Biomechanics in Sports, 1 P., 2009.
Germon "Excalibur E2", The New Inventors, ABC, 4 P., 2011.
Pelham et al. "Assessing Human Movement With Accelerometry", Work, 27(1): 21-28, 2006.
Polaritas "DigiTrainer User's Manual", Firmware Version: 1.03, 21 P. Nov. 3, 2009.
Weba Sports "RowX Outdoor", Weba Sports, Retrieved from Internet, 4 P., 2011.
Communication Pursuant to Article 94(3) EPC dated Apr. 19, 2017 From the European Patent Office Re. Application No. 12854919.3. (10 Pages).
Examination Report dated May 30, 2017 From the Australian Government, IP Australia Re. Application No. 2012348521. (4 Pages).
Tchobanoglous et al. "Wastewater Engineering: Treatment and Reuse", Metcalf & Eddy, Inc., 4th Edition, pp. 356-358, 2003.

* cited by examiner

PADDLE LINK—REAL TIME PADDLING PERFORMANCE

RELATED APPLICATION

This application claims the benefit of priority under 35 USC § 119(e) of U.S. Provisional Patent Application No. 61/566,717 filed 5 Dec. 2011, the contents of which are incorporated herein by reference in their entirety.

FIELD AND BACKGROUND OF THE INVENTION

The present invention, in some embodiments thereof, relates to a system and method for coaching and/or monitoring paddling and, more particularly, but not exclusively, to a system for tracking a trajectory of a paddling instrument (for example a paddle and/or an oar) and/or for computing a paddling force and/or for determining a strategy to improve paddling.

In today's technology stuffed world, many people seek ways to return to natural activity and natural environments. Rowing, paddling and kayaking are activities that offer an environmentally friendly way to enjoy nature and get healthy exercise.

Kayaking in calm controlled environments, for example lakes and/or calm rivers, provides training and relaxing exercise. Kayaking may also include trips to pristine difficult to access areas. Kayakers that are more adventurous may travel on rough water in high velocity rivers or wavy seas. Some kayakers also navigate long distances at sea.

Both amateur and professional athletes desire to improve and measure their performance. Therefore, in many sports, training equipment and methodology have become popular.

U.S. Pat. Nos. 7,272,499 and 7,715,982 to Grenfell disclose a method and system for monitoring performance characteristics of athletes in general and also athletes in watercraft and in water sports such as rowing, kayaking, surf-ski riding and sailing. The system includes a movement sensor, which is preferably an accelerometer. Examples of sensors include an impeller unit to sense velocity, a global positional sensor GPS unit to sense instantaneous boat position and velocity, and an accelerometer mountable on the boat to derive acceleration and velocity data in three dimensions, or combinations of these sensors. For athletics, the device is attached to an athlete near the small of the back.

U.S. Pat. No. 6,980,118 to Buvac discloses a device that detects the squaring and feathering of an oar during rowing. The time interval between two consecutive feathers is measured, and it is used to calculate the stroke rating. It is mounted to an oar close to the grip of the oar. An enclosure houses a display, a sensor, a microcontroller, a power source and a clock, which is a component of the microcontroller.

U.S. Pat. No. 7,114,398 to Haines discloses a load cell which measures the force applied to, for example, an oarlock, which can be an element of a complete instrumentation system for rowing. A boat motion sensor derives speed data from an impeller, showing fluctuations in boat speed through each stroke. This is supplemented by a measurement of boat acceleration, giving a highly sensitive indication of hull efficiency, check factor and crew body movement. It is possible to run the system with just the boat motion sensor. Other sensors, such as stretcher force and seat position, may also be included.

Additional background art includes the Merlin Excalibur paddle available from Talon Technology Pty Ltd 111/10 Old Pittwater Rd Brookvale NSW 2100 Australia, US published patent application 2005/0,215,870, US published patent application 2005/0,085,348, International patent application WO 2008/106,748 Bulgarian patent 64134.

SUMMARY OF THE INVENTION

According to an aspect of some embodiments of the present invention there is provided a method for monitoring paddling including mounting a position sensor onto a paddling instrument, and tracking a trajectory of the paddling instrument with the position sensor.

According to some embodiments of the invention, the tracking includes distinguishing a balance between left and right motion of the trajectory, an angular acceleration of the trajectory, a catch location of the trajectory, a finish location of the trajectory, a location of a portion of a stroke in relation to a preferred paddling area, and/or a conformance of the trajectory with a preferred trajectory.

According to some embodiments of the invention, the method also includes determining a paddling improvement strategy corresponding to the trajectory.

According to some embodiments of the invention, the paddling improvement strategy corresponds to a location of a portion of a paddling stroke.

According to some embodiments of the invention, the paddling improvement strategy includes guidance for improving paddling efficiency, improving left-right paddling balance, improving a forward stroke, improving a sweep stroke, reaching a destination in a specified time period, improving fitness of a paddler, improving coordination of a rowing team, choosing a member of a rowing team, and/or increasing stability of a boat.

According to some embodiments of the invention, the method also includes recognizing a sweep stroke.

According to some embodiments of the invention, the method also includes recognizing a wobble of a boat.

According to some embodiments of the invention, the method also includes tracking a trajectory of a boat, and computing a relative trajectory of the paddling instrument with respect to the boat.

According to some embodiments of the invention, the method also includes delineating a preferred paddling area and distinguishing a conformance of the trajectory with the preferred paddling area.

According to some embodiments of the invention, the method also includes transmitting data on the trajectory to a remote location.

According to some embodiments of the invention, the transmitting is repeated, and an interval between the repetitions of the transmitting is greater than an interval between measurements of the trajectory.

According to some embodiments of the invention, the transmitting is performed conditional to a phase of a stroke.

According to some embodiments of the invention, the method also includes adjusting calibration based on the tracking.

According to an aspect of some embodiments of the present invention there is provided a method for monitoring paddling including: mounting a position sensor on a paddling instrument; tracking a trajectory of the paddling instrument with the position sensor, and calculating a force on the blade based on the trajectory.

According to an aspect of some embodiments of the present invention there is provided a system including: a position sensor configured for mounting on a paddling instrument, and a processor configured for computing a trajectory of the paddling instrument from an output of the position sensor.

According to some embodiments of the invention, the system also includes an output device configured for recommending a strategy to a paddler.

According to some embodiments of the invention, the position sensor includes an accelerometer, a motion detector, a magnetic sensor, a gravimeter, a gyro, a GPS receiver, a strain gauge, and/or a flow meter.

According to some embodiments of the invention, the system also includes a second position sensor mounted on a boat and wherein the processor is further configured for computing a trajectory of the paddling instrument with respect to the boat.

According to some embodiments, the paddling instrument includes a plurality of blades and the processor is further configured for comparing a trajectory of a first blade of the plurality of blades to a trajectory of a second blade of the plurality of blades.

According to an aspect of some embodiments of the present invention there is provided a method for monitoring a paddling team including mounting a corresponding position sensor of a plurality of position sensors to each paddling instrument of a plurality paddling instruments, and tracking a corresponding trajectory of each of the paddling instruments with the corresponding position sensor.

According to some embodiments, the method also includes collecting data on the stamina of at least one rower based on the corresponding trajectory.

According to some embodiments, the method further includes choosing a member of the paddling team based on a result of the tracking.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
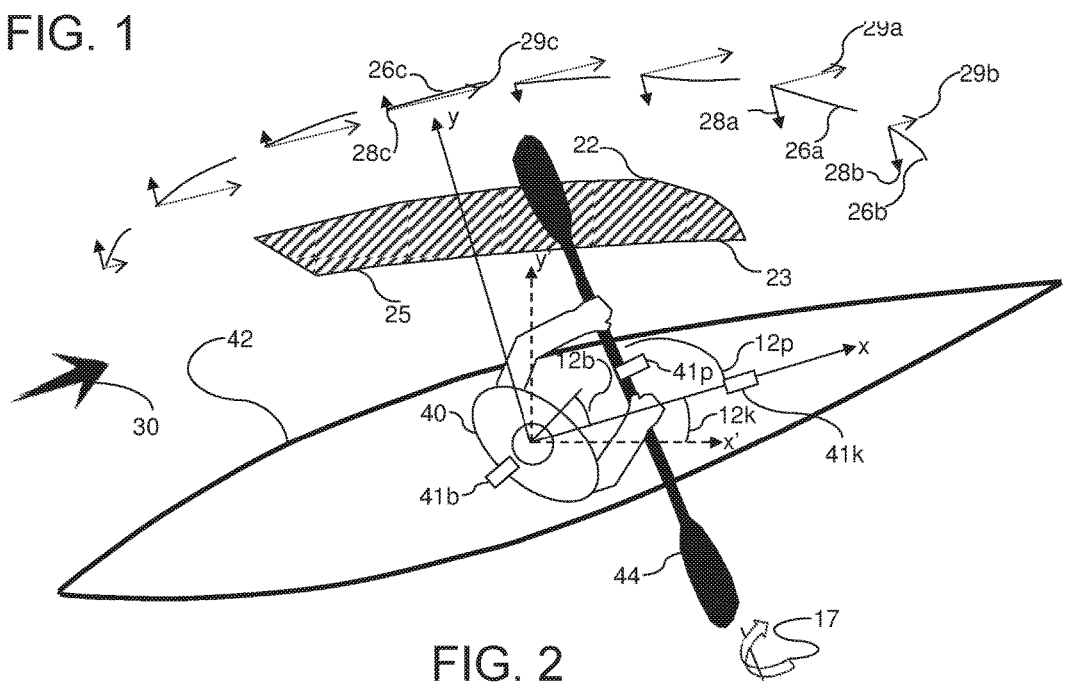
FIG. 1 overhead view of a kayak with three position sensor modules.

The present invention, in some embodiments thereof, relates to a system and method for coaching and/or monitoring paddling and, more particularly, but not exclusively, to a system for tracking a trajectory of a paddling instrument and/or for computing a paddling force and/or for determining a strategy to improve paddling.

In some embodiments of the present invention, a position sensor may be mounted to a shaft of a paddling instrument. The position sensor may optionally be employed for tracking a trajectory of the paddling instrument. Tracking a trajectory of a paddling instrument may optionally include measuring and/or computing the one or more of the following:

the vector location of a point on the paddling instrument and/or the direction and/or magnitude of the rate of change of the location of the point and/or the direction and/or magnitude of the acceleration of the point The trajectory may be expressed relative to one or more of the following objects:

a fixed point on the earth;

an object (for example a rower and/or a boat);

an axis that is fixed with respect to the earth;

an axis that is fixed with respect to an object (for example an axis of a rower and/or a boat);

an axis of the paddling instrument (for example the angle feathering of rotation of the paddling instrument around its own axis).

In some embodiments, a position sensor may be mounted to a boat. A processor may optionally integrate data from the boat mounted position sensor and the position sensor mounted on the paddling instrument. For example, the processor may compute the trajectory of the paddling instrument with respect to the boat.

Optionally a processor may compute a force on a blade of a paddling instrument. The force calculations may take into consideration the geometry of the blade, the trajectory of the blade and the water conditions.

In some embodiments, the present invention may include one or more modules. A module may optionally be mounted to a boat and/or to a paddler and/or to a paddling instrument and/or located at a remote location. Some optional components that may be found (either individually or in combination) in a module include, for example:

a position sensor;

a stress/strain gauge;

a processor;

a visual output device;

an audio output device;

a physiological measuring device (for example a heart pulse meter or a breathing meter or a thermometer);

an input device (for example a microphone or a touch sensitive device);

a fluid sensor (for example for sensing when a blade of a paddling instrument enters the water);

and/or a memory.

In some embodiments, a position sensor may measure location in space and/or displacement. The measure may be scalar or vector. In some embodiments, a position sensor may include one or more of the following:

an accelerometer (for example, the resolution of the accelerometer may be 10 bits or more. The range of the accelerometer may be for example 1-16 G);

a range sensor;

an orientation sensor;

a transmitter and receiver;

a motion detector;

a magnetic sensor;

a gravimeter;

a gyro;

a GPS receiver;

a flow meter (for example an impeller and/or a thermal flow meter);

a signal transmitter;

a velocimeter;

a processor, and/or radar

In some embodiments, measurements may be made 20-100 times per second or more.

In some embodiments, the relative location of objects may be computed. Optionally relative location may be computed by integrating output of multiple position sensors. For example, in some embodiments a processor may compute the location of a paddle blade relative to a boat and/or relative to the water surface. Optionally computations may include Doppler Effect and/or triangulation.

In some embodiments, calculations may optionally include one or more of the following:

the force on a blade (which may optionally be a function of the size and angle of the blade, the depth of the stroke, the speed of the stroke, water conditions [wavy, smooth, with the current, against the current]);

the location of the blade;

the stroke rate;

a trajectory of a portion of a rowing and/or paddling stroke;

a comparison between left and right paddling strokes;

a correlation between multiple rowers and/or paddlers (for example for choosing or training a rowing team).

In some embodiments, the system will include navigational aids. For example, the system may optionally include a GPS receiver and a trip itinerary. The user may be informed of his progress and/or of recommendations to help him arrive at his intended destination on time.

Rowing and Paddling Strokes:

In some embodiments, a trajectory may optionally be divided into units associated with a paddling and/or rowing stroke. For example, the units of a stroke may be divided into four phases: catch, drive, finish and recovery. In alternative embodiments, a stroke may be divided into more or fewer than four phases.

A catch phase may include placing of the blade into the water. Some embodiments of a coaching system may optionally encourage a rower and/or paddler to execute the catch quickly while minimizing disturbance to the boat. For example, some embodiments of a coaching system may encourage a rower and/or paddler to minimize back and/or front splash and/or to minimize check and/or to square the blade fully to the water at the catch.

A drive phase may include the portion of the stroke where the blade is pushing against the water. In some strokes, pushing the blade against the water may cause the boat to accelerate or decelerate.

A finish phase may follow the drive phase. In the finish phase, the paddler may finish applying power and remove the blade of the paddle from the water. Some embodiments of a coaching system may optionally encourage a rower to remove the blade sharply from the water and then to feather the blade so that it becomes parallel to the surface of the water. Proper feathering may reduce air drag.

A recovery phase may follow the finish phase. During the recover phase, the blade may be returned to the forward position and squared for the next catch. Some embodiments of a coaching system may optionally encourage rowers and/or paddlers to gradually square the blade perpendicular to the surface of the water during recovery and to prepare for the next catch.

In team rowing, some embodiments of a coaching system may optionally encourage all members of the crew of a boat to synchronize their catch phases. Out of step catches (unsynchronisation) may cause balance problems and reduce a boat's speed. It is often desirable that the power and/or weight on both sides of the boat be balanced and remain balanced whether the rowers are fresh or tired. Some embodiments of a coaching system may optionally compare strokes and/or timing and/or power on the two sides of a boat.

There are many similarities between paddling a kayak and rowing a boat. There are also some significant differences. An oar for rowing may have a pivot fixed to the boat at the oarlock.

A paddle may not have fixed pivot. The paddle may be connected to the kayak only through the body of the paddler. The paddle, paddler and kayak may all move independently. The large number of degrees of freedom of paddling may make it a challenge to parameterize and monitor paddling.

Kayaks often use a paddle consisting two blades at opposite ends of a shaft. The blades may be feathered at different angles. When paddling straight under calm conditions with a two-blade paddle, the catch, drive and finish portions of the stroke of the right blade of the paddle are commonly performed while the left blade is in recovery. The catch, drive and finish phases of the left blade are commonly performed while the right blade is in recovery.

Except when clearly limited otherwise, the word paddling, as used herein, refers to both paddling and rowing. The term paddling instrument is used herein in the broad sense including at least an oar, a single sided paddle (for example as often used in canoes and dragon boats) and/or a two sided paddle (for example as often used in kayaks).

Directional Orientation and Parameterization

Figure 2:
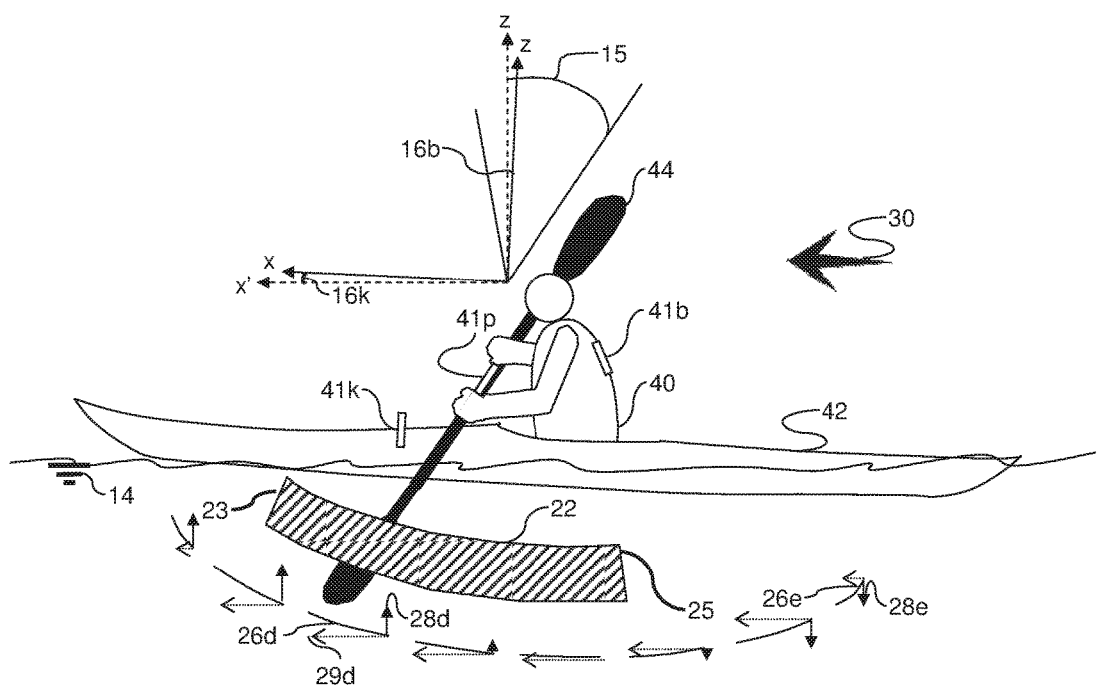
FIG. 2 is port side view of a kayak with three position sensor modules.
Figure 3:
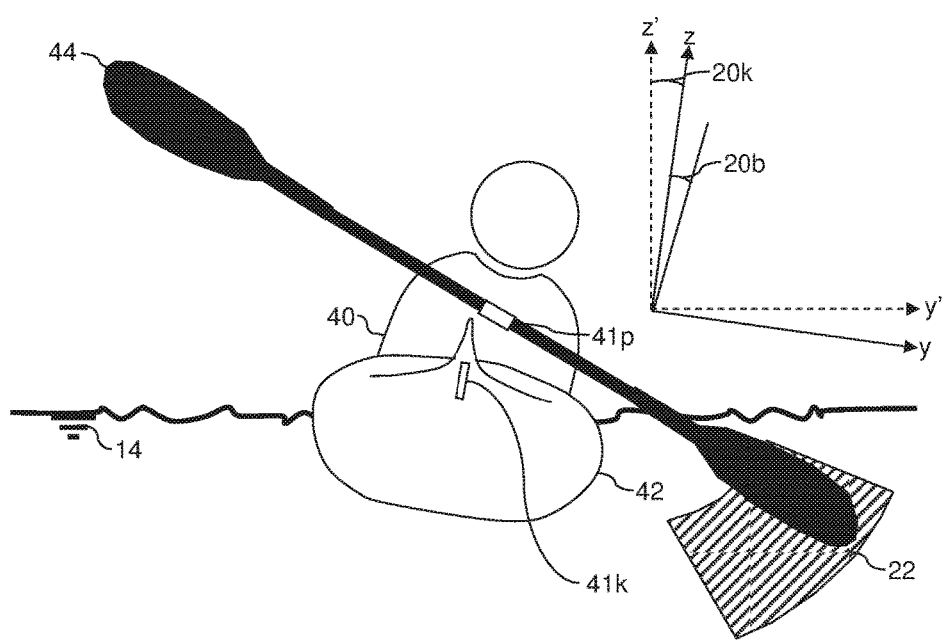
FIG. 3 is a front view of a kayak with three position sensor modules.

There may be many ways to parameterize 3D motion. For the sake of clarity, FIGS. 1, 2 and 3 illustrate an exemplary division of six degrees of freedom in boat motion. FIG. 1 shows an overhead view of a kayak 42. FIG. 2 illustrates a view of kayak 42 from the port (left) side. FIG. 3 illustrates kayak 42 from the bow (front). Arrow 30 shows the direction of forward movement of kayak 42

In FIG. 1, the fixed horizontal axes are labeled x' and y' while axes of kayak 42 are labeled x and y. In FIGS. 2 and 3, the fixed vertical axis is labeled z' and the vertical axis of kayak 42 is labeled z'.

Specifically, the three axes kayak 42 (the axes move with the boat) are defined herein as "x" the longitudinal axis, and "y" the lateral axis, and "z" the vertical axis. Translational movement along these three axes may be described as surge (longitudinal motion along the x-axis), sway (lateral motion along the y-axis) and heave (up and down motion along the z-axis).

Rotation of kayak 42 may also described in terms of the x, y, z axes. According to engineering and aviation terminology, rotation of kayak 42 around the z-axis may be called yaw 12k (see FIG. 1) (herein yaw refers to intentional or unintentional turning). Rotation of kayak 42 around the y-axis may be called pitch 16k (see FIG. 2). Rotation of kayak 42 around the x-axis may be called roll 20k (see FIG. 3).

For convenience, three rotational angles of a paddler 40 with respect to kayak 42 may be described herein. Twisting of paddler 40 around the z-axis may be called yaw 12b (see FIG. 1). Yaw 12b of paddler 40 is herein exemplified by the angle between the line of sight of paddler 40 in the x-y plane and the longitudinal "x" axis of kayak 42. Leaning of paddler 40 forward or backward with respect to kayak 42 may be called pitch 16b of the paddler (see FIG. 2). The pitch 16b angle is exemplary of the angle between the body of paddler 40 and the z-axis of kayak 40 in the x-z plane. Leaning of paddler 40 sideways with respect to kayak 42 may be called roll 20b (see FIG. 3). Roll 20b angle is exemplary of the angle between the body of paddler 40 and the z-axis of kayak 40 in the y-z plane.

For convenience, motions of a paddle 44 may be described herein in a mixed coordinate system. The yaw 12p angle of paddle 44 may be defined as the angle between the axis of paddle 44 and the longitudinal "x" axis of kayak 42 (see FIG. 1). The vertical 15 angle of paddle 44 may be defined as the azimuth angle of paddle 44 with the true vertical z'-axis (see FIG. 2). The true vertical z'-axis is perpendicular to the y' and x'-axes which are parallel to water surface, zw 14. Rotation of paddle 44 around its own axis may be called "feathering" 17 as is known to those skilled in the art of paddling.

Paddling Technique:

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

In some embodiments, the present invention detects the use of inefficient techniques by a paddler. Detection may use appropriate measuring tools and an appropriate algorithm. Optionally measurements may be enhanced by compensating for boat movement, sea condition etc.

For example, experienced kayak paddlers often employ a swinging technique for forward power paddling. Using this technique, the paddle may be moved right to left using the body spine as a pivot. Muscles throughout the entire body may contribute to the stroke. In contrast, beginning paddlers may tend to use inefficient rolling actions, paddling predominantly with their arms. While one arm pushes and another pulls the paddle.

In some embodiments, a preferred paddling area may be delineated. In FIG. 1, hatching illustrates an example of a preferred paddling area 22 for placement of the blade of paddle 44. The preferred catch portion 23 of the stroke and the preferred finish portion 25 of the stroke are also marked.

Force vectors 26a, 26b and 26c illustrate the direction of the force on paddle 44 at different points in the stroke. Each force vector 26a-c is broken into a desirable (dashed arrows) component 29a, 29b, and 29c and an undesirable (solid arrows) component 28a, 28b and 28c.

In some embodiments, the preferred paddling area 22 may be delineated to include an area wherein a large portion of the force is desirable (for example vector 26c and components 28c and 29c). When the trajectory of paddle 44 does not conform to the preferred paddle area 22 (the blade travels outside of preferred paddling area 22), a large portion of the force may be undesirable.

For example, when the catch is too far forward (ahead of preferred paddling area 22) and sweeps outward, force vector 26b may include a strong sideways component 28b. Paddling in this undesirable zone may waste energy and/or produce undesired sideways forces. The undesired sideways forces may cause kayak 42 to wobble in the yawing angle. This may make it difficult to navigate, reduces stability and/or slow forward 30 progress of the boat.

FIG. 2 illustrates a port side view of kayak 42 with a desirable paddling area 22 marked by hatching. A force vector 26d is illustrated as having a desirable component 29d and an undesirable component 28d. When the finish of a stroke is too far backward, force vector 26e may have a large undesirable vertical component 28e which may cause the front of kayak 42 to pitch upward. This may lead to wobble in the pitch angle. This pitch wobbling may have various undesirable effects including unpleasant seasickness, wasting energy and slowing progress. A similar effect may occur when the catch of the stroke is too early and paddle 44 is swept downward.

Components of Paddling Performance Analysis Modules:

Various components of a coaching and monitoring system may be mounted in modules. A single module may be configured to function independently, or a group of modules may be configured to function in an integrated fashion.

For example, FIGS. 1-4 illustrate an exemplary configuration having three wirelessly integrated modules. In the exemplary configuration, module 41k is mounted on kayak 42; module 41b is mounted on paddler 40, and module 41p is mounted on paddle 44. In the exemplary embodiment, data is optionally transmitted between modules using a local protocol.

In the exemplary embodiment, module 41k acts as a local hub. In the exemplary embodiment, the local hub integrates data and calculates derived quantities. In some embodiments, quantities that the local hub calculates may include one or both of the relative position of the blade of paddle 44 with respect to kayak 42 and/or the current phase of the stroke cycle. Optionally, the local hub may transmit all or part of the data on the trajectory to a remote location.

In some embodiments the module containing the hub may be located on the paddle and/or on the paddler and/or remotely. In some embodiments, one or more modules may function independently of the central hub. Some embodiments may not include a central hub.

In some embodiments, the local hub may communicate a paddling improvement strategy to paddler 40. Additionally or alternatively, data may be sent for remote coaching and/or monitoring of a sporting event and/or for broadcast, for example via display on an electronic billboard to sports fans or via radio, TV and/or the Internet.

In some embodiments, a module may include one or more of the following:

a positions sensor;
a communication mechanism (for example a module may communicate with another component of the system via a wireless transceiver and/or the module may communicate with a user via a human interface), and/or a power source.

Other optional components may be included in a module, for example:
- a physiological sensor;
- a memory;
- a processor;
- a mounting mechanism;
- a tether;
- a strain gauge;
- a waterproof casing, and/or
- a floatation device.

In various alternative embodiments, a module may be detachable and/or rechargeable. It may have water-resistant shell. The module may be attached with a quick release attachment system, which allows plug and unplug functionality.

Figure 4A:
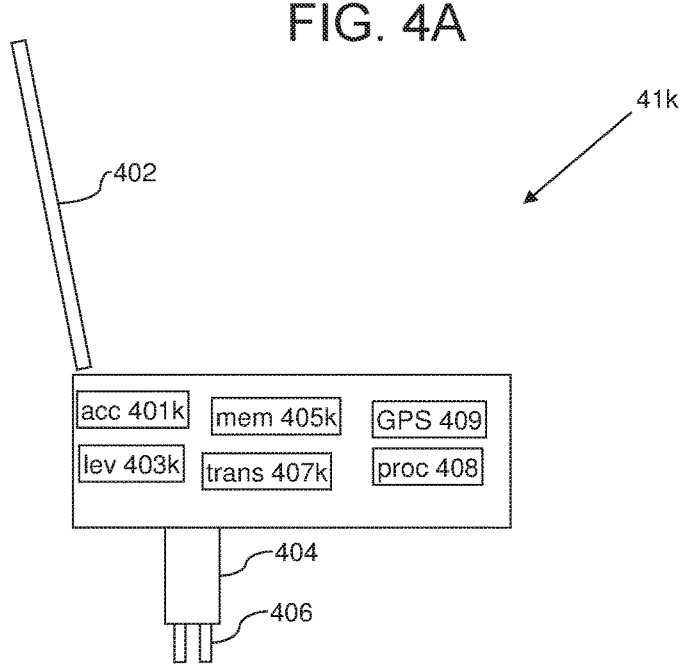
FIG. 4A is a schematic illustration of a first embodiment of a position sensor module.
Figure 4B:
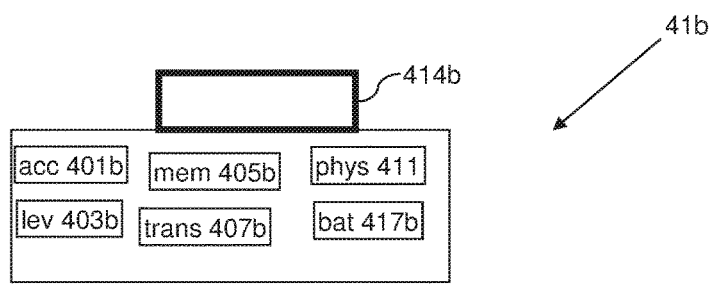
FIG. 4B is a schematic illustration of a second embodiment of a position sensor module.
Figure 4C:
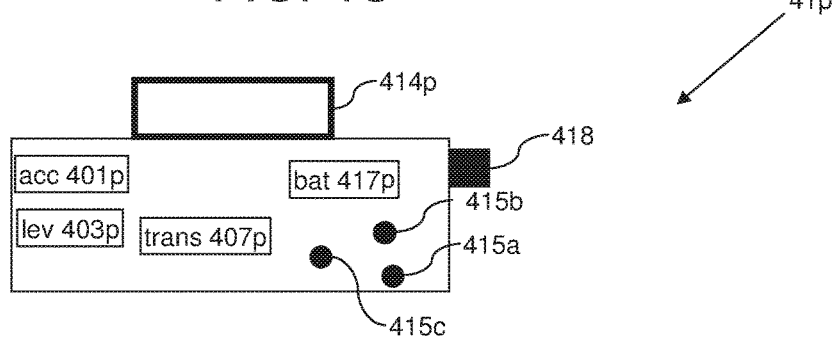
FIG. 4C is a schematic illustration of a third embodiment of a position sensor module.

An exemplary embodiment of module 41*k* is illustrated in FIG. 4*a*. Exemplary module 41*k* optionally includes multiple position sensors, for example: accelerometer 401*k*, a GPS receiver 409 and a level sensor 403*k*. Module 41*k* also includes other optional components, for example, a wireless transceiver 407*k* and a touch sensitive liquid crystal display LCD 402 for communication. Optionally, module 41*k* is the local data storage, processing and transmission hub. Module 41*k* includes optional data storage cyclic memory 405*k* and a data processor 408. In the exemplary embodiment, module 41*k* is configured for mounting to Kayak 42. For example, module 401*k* includes a quick release mount 404 that has a plug-in electrical connection 406. In the example, module 41*b* receives power from an on board battery in kayak 42 via electrical connector 406.

Transceiver 407*k* includes a local transceiver for communication between components on board kayak 42. For example, in some embodiments communication may employ the ANT™ protocol. Optionally communication may employ Bluetooth®, Bluetooth® LE (low energy) or any other protocol. The ANT™ protocol may be implemented for example using a TI CC2571 chip (available from Texas Instruments, Post Office Box 655303, Dallas, Tex. 75265). Transceiver 407*k* also includes an optional long distance protocol for sending data to a remote computer. For example, a remote computer might perform analysis that is too complex for processor 408, and/or the remote processor may be used for coaching and/or for sports broadcasting. In some embodiments, data may be sent to the remote computer intermittently. Intermittent data transmission may use less battery power than more frequent transmissions.

In some embodiments, a trajectory of a paddling instrument may be measured using a scalar position sensor. For example, three scalar position sensors located at three points on a kayak may measure the distance to a point on a paddling instrument. The vector location of the point in space may be computed by triangulation. In some embodiments, the orientation of the paddling instrument may be measured by measuring the distance between a point on the kayak and three points on the paddle. The three-dimensional orientation of the paddle may be determined by triangulation.

An alternative example of a Module 41*b* is configured for attachment to a paddler. For example, module 41*b* may include a loop 414*b* for strapping module 41*b* to paddler 40. In the exemplary embodiment, module 41*b* includes an accelerometer 401*b* and a level sensor 403*b*. Module 41*b* includes wireless transceiver 407*b*, a local memory 405*b*, and a battery 417*b*. In some embodiments, module 41*b* may communicate wirelessly with a combination microphone/ earphone for interaction with paddler 40. Alternatively, or additionally module 41*b* could include an earphone jack for wired interaction with paddler 40. Optionally, interaction includes synthesizing voice signals to give instructions to paddler 40 and receiving voice commands from paddler 40. Optionally module 41*b* may be integrated with a cellular telephone, a portable electronic display and/or a personal computing device. Module 41*b* further includes an optional physiological sensor 411.

Figure 5:
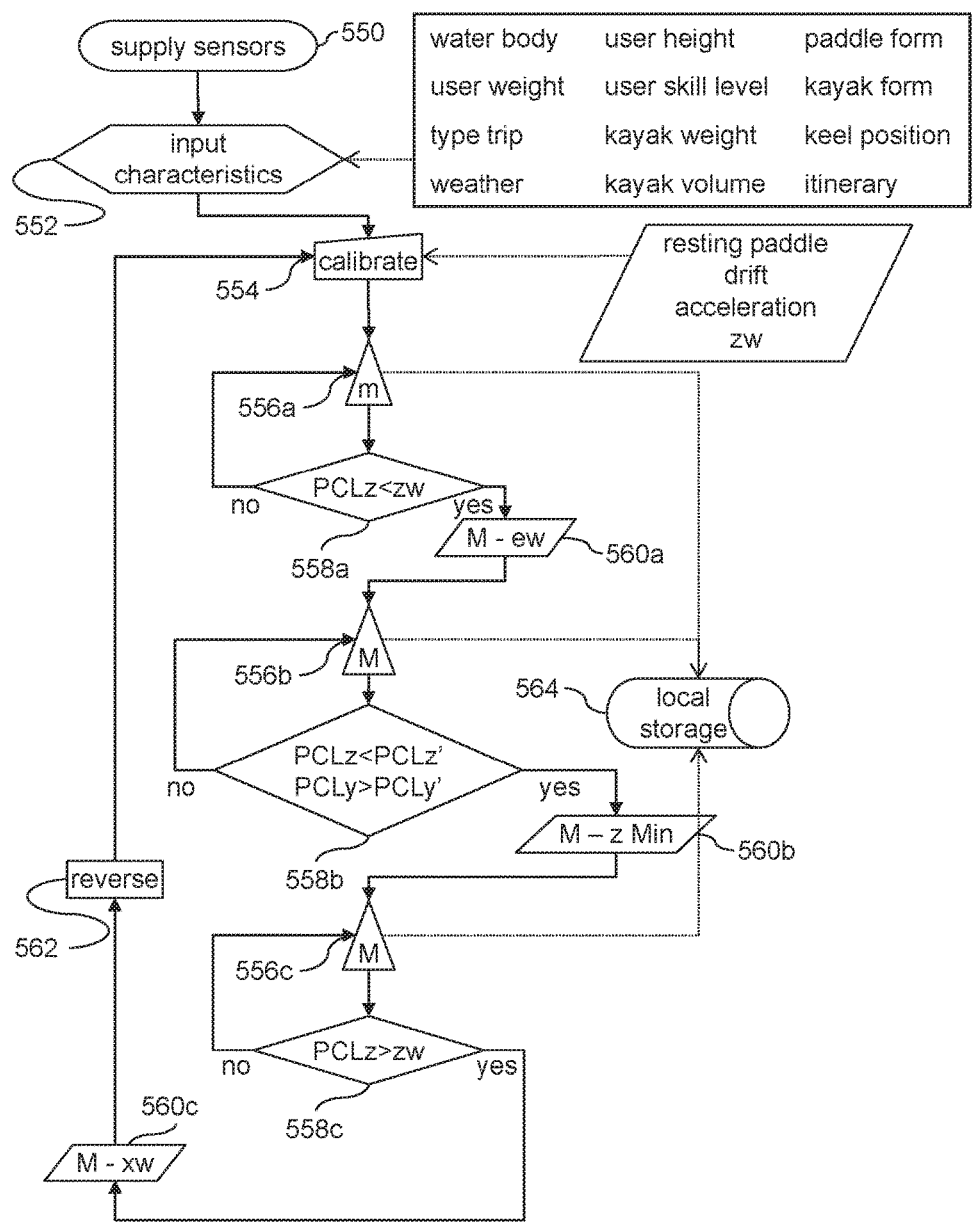
FIG. 5 is a flow chart illustrating a method for detecting a trajectory of a paddling instrument.

Another example Module 41*p* is configured for mounting on the shaft of paddle 44. For example, module 41*p* includes a loop 414*p* for strapping module 41*p* to the shaft. Optionally, module 41*b* includes an accelerometer 401*p*, a wireless transceiver 407*p*, a level sensor 403*p*, a battery 417*p* and a few different colored light emitting diodes LED's 415*a-c* for interaction with paddler 40. For instance, a first LED 415*a* may flash green at a chosen paddling cadence to help paddler 40 keep a steady paddling rate. A red LED 415*b* may light when the left catch is too late, and red and blue LED's 415*b, c* may light when the right catch is too early. An optional power button 418 is included An Example of a Method of Monitoring Paddling:

FIG. 5 is a flow chart illustrating an exemplary embodiment of method for tracking a trajectory and determining a paddling improvement strategy. In the exemplary embodiment, three sensor modules 41*k*, 41*b* and 41*p* are supplied 550.

Optionally various characteristics of the system may be input 552. The input characteristics may include one or more of the following:
- characteristics of the water body;
- details about kayak 42 (for example weight, length, volume, form, model);
- the position of a keel;
- a trip itinerary;
- weather conditions;
- details about paddler 40 (for example height weight and skill level), and or
- details of paddle 44 (for example the length, the feathering angle between the blades, the blade form, the blade surface area);

For convenience, the hub may optionally access data describing known models of boats and/or paddling instruments (for example in an internal memory and/or through access to a remote database). In such a case, a kayaker would just input the model number of his kayak and paddle and all of the relevant details would automatically be retrieved.

The hub may also include a user database with details of the vital statistics and/or skill level and/or rowing history of one or more users. Then the user would just log in and his data (his skill level, height, weight, and/or age) would be supplied automatically. Optionally the hub may include automated calibration routines and/or artificial intelligence to adjust training requirements as a user improves his techniques.

Optionally the system may be calibrated 554. Calibration 554 may include, for example, allowing kayak 42 to drift with paddle 44 lying flat on the deck of kayak 42 transverse to the longitudinal x-axis of kayak 42. In the example, calibration resolves the background drift velocity and the location of the fixed axes. Additionally or alternatively, an optional calibration measurement may include measuring the height of the water surface (zw 14) and the feathering position of paddle 44. For example, the calibration measurement may be made while holding paddle 44 with the blade squared and just touching the surface of the water.

Once calibrated, each module 41b,p in the illustrative example measures 556a location and angle with a measuring interval of 20 mili-seconds and transmits the measurements to the hub. Optionally, at each time interval, processor 408 integrates the measurements. In the exemplary embodiment, the hub stores 564 the absolute and relative location and angles of paddle 44, kayak 42 and paddler 40 at each time interval.

Optionally, the hub may use the data to recognize a stroke type and/or to ascertain the current phase of a stroke cycle. In the exemplary embodiment, each module 41k,p,b has an automatic power saving mode. When there is not significant acceleration of the module for a five-minute period, module 41k,p,b goes into power saving mode. Module 41k,p,b is automatically reactivated when it is again accelerated.

In the exemplary embodiment, the hub also transmits data on the trajectory to a remote module (not located on kayak 42). In some embodiments, the interval between data transmission 560a, 560b, 560c to the remote module will be greater than the interval between measurements. For example, in the exemplary embodiment, the hub does not transmit data to the remote module on every time step. Transmission is conditional on the phase of the stroke; for example, remote transmission occurs only at the catch, finish and maximum depth point of the drive phase of each stroke. Increasing the interval between transmissions may reduce the number of transmissions. Reducing the number of transmissions may save battery power compared to transmitting more frequently.

In some embodiments, the hub may store measurements only when certain conditions are met (for instance at the catch, the maximum point of the drive and the finish). This may save memory compared to storing data of every measuring point.

In further alternative embodiments, data may be stored and/or transmitted only when the paddling instrument is in motion. Not transmitting when the paddling instrument is stationary may save battery power and memory.

In the exemplary embodiment, processor 408 tracks 558a the position of both blades of paddle 44. In the example of FIG. 5, both blades of paddle 44 are out of the water at the end of calibration 554. The hub waits for the catch portion of a stroke to start transmitting data. More specifically, when tracking 558a algorithm detects that the vertical location of a blade (PCLz) goes below the water surface (PCLz<zw), then the hub transmits 560a data from the last set of measurements to a remote module.

After transmitting 560a the catch data, each module 41b,p in the exemplary embodiment continues to make measurements 556b and transmit them locally to the hub. Processor 408 continues to store 564 data locally and to track 558b the position of the current drive blade of paddle 44 (the blade that is currently in the drive portion of the stroke). In the example, data is next transmitted 560b to the remote module when the drive blade reaches its deepest (z Min) or furthest point from the kayak (either the current height of the blade is greater than the previous height measurement PCLz>PCLz' or the current distance from kayak 42 is less than the previous distance PCLy<PCLy').

In the exemplary embodiment, after transmitting 560b the maximum depth data, each module 41b,p continues to make measurements 556c and transmit them locally to the hub. Processor 408 continues to store 564 the data locally and track 558c the position of the current drive blade of paddle 44 (the blade that is currently in the drive portion of the stroke). Data is transmitted 560c to the remote module when the tracking 558c algorithm detects the finish portion of the stroke (when the drive blade exits the water [M xw] the height of the blade is above the water level [PCLz>zw]).

Once the finish of the stroke has been detected, in the exemplary embodiment, the y-axis is reversed 562 and system waits to measure a new stroke on the opposite blade of paddle 44. Calibration 554 optionally is rechecked. Rechecking may include testing whether changes in acceleration of kayak 42 measured by module 41k match the predicted acceleration based on the movement of paddle 44. Similarly, the acceleration during the time when both blades of paddle 44 are out of the water may be compared to that predicted according to previous calibration. Accordingly, processor 408 may optionally adjust calibration data on the water conditions (for example the estimated current speed), form of the paddling instrument, form of the boat, or keel position to allow better prediction of boat's performance.

In some exemplary configurations, a single sensor module 41p is mounted on a paddling instrument. Such a configuration might be useful on smooth water (for example a lake) where the position of the boat may be estimated based on the location of the paddling instrument. Such a configuration may be used for a rented kayak (on which it is not practical to mount a movement sensor). Such a configuration may be useful for training off the water using a training apparatus with known geometry and flow.

From a single movement sensor installed on the paddling instrument it is possible to ascertain, for example, the timing of strokes from feathering or from the height of the blade and the known level of the water surface. Also by tracking the location of the center of the paddle, it is possible to estimate the mean speed of the boat and the mean stroke length (the stroke length may optionally include the distance traveled by a point on the paddle along its curved trajectory and/or a linear distance between two points on the trajectory [for example the linear distance between the catch and the finish location]). All this data is also available separately for left and right sides of the stroke.

Determining a Strategy to Improve Paddling:

A coaching and monitoring system may optionally determine strategies for improving paddling. Optionally the strategy will depend on the kind of stroke and the skill of the paddler.

Various kinds of strokes exist; for example, power strokes for moving the boat forward and/or backward include one-sided paddling, rowing, the J-stroke, sideways paddling includes the draw stroke, turning strokes include the forward and backward sweep stroke (a sweep stroke is a set of one or more strokes that are made by the paddler in order to change the direction of the boat). A system for determining a strategy to improve paddling may optionally recognize different kinds of strokes. For each kind of stroke, there may optionally be a different method for tracking a trajectory, and/or a different method for determining a paddling improvement strategy.

One possible way for determining an improvement strategy for a stroke is to discern particular problem in the trajectory and determine an improvement strategy. Alternatively or additionally, an improvement strategy may be discerned by comparing a paddling outcome (such as force, acceleration, turning rate) with an expected outcome and determine methods for improving the outcome. For example, the acceleration and velocity of a stroke may be compared with acceleration of kayak 52. For example, when there is fast paddling but almost no speed contribution to kayak 42 the paddler may optionally be told to dig deeper into the water.

There can be a large inherent variability in strokes. The improvement strategy may be based on a single trajectory measurement and/or on statistics of multiple strokes.

Figure 6:
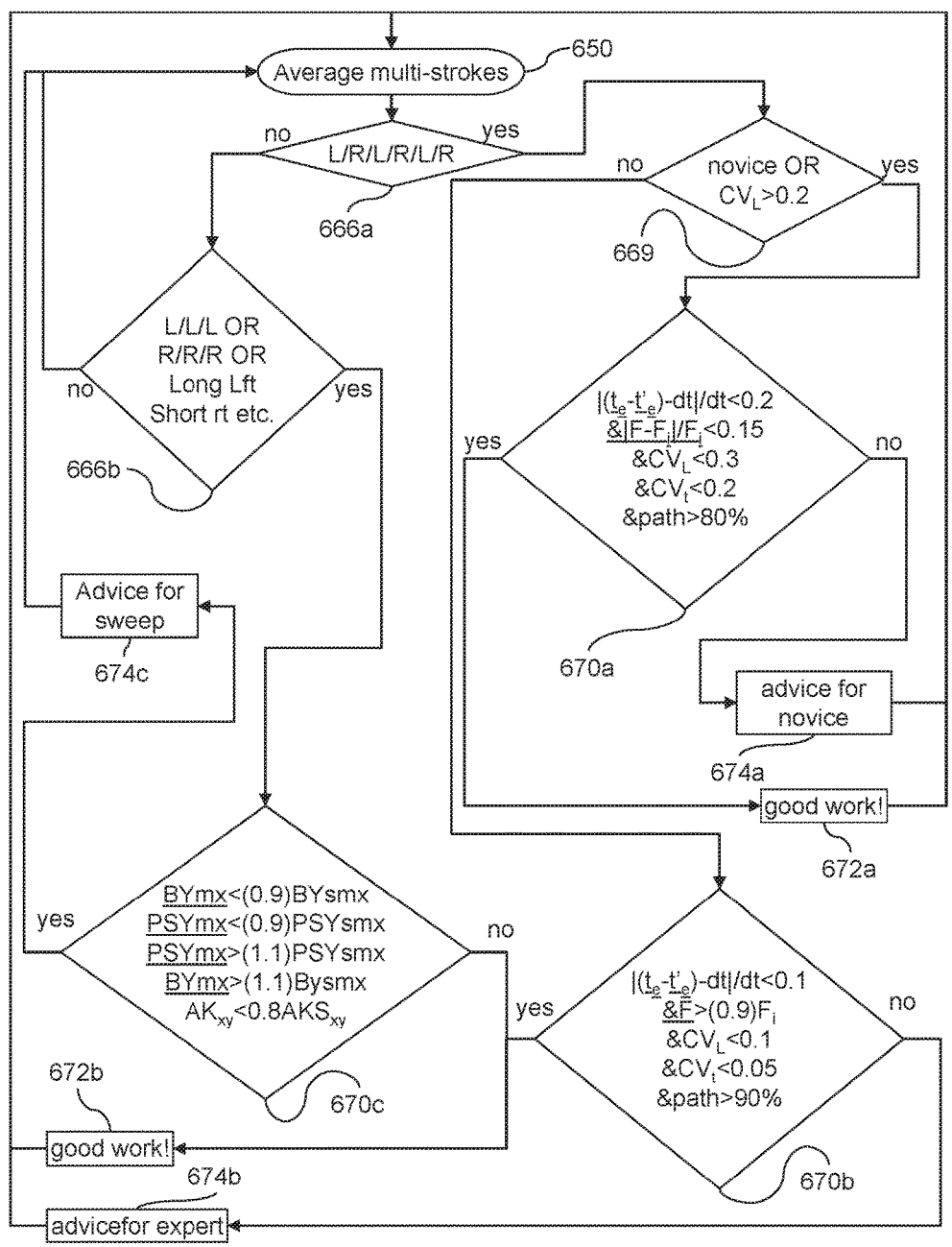
FIG. 6 is a flow chart illustrating method of determining a paddling improvement strategy.

FIG. 6 is a flow chart illustrating an exemplary method of determining a paddling improvement strategy.

In the exemplary method, the first step is to average 650 a number of strokes together. Optionally, the left and right strokes may be averaged separately and/or compared. The number of strokes averaged may optionally be dependent on various factors. The factors may include, for example one or more of:
- the skill level of the paddler (for example for novice paddlers the average may include more strokes)
- the sea conditions (for example in rough water the number of strokes averaged may increase).

In the exemplary embodiment, before discerning an improvement strategy, the type of stroke is recognized. For example, processor 408 may optionally be configured to compare a left trajectory to a right trajectory. For example, a left trajectory may pertain to a left oar and a right trajectory to a right oar. Alternatively or additionally, a left trajectory may pertain to a left blade of a two bladed paddle and a right trajectory to a right blade. Alternatively or additionally, a left trajectory may pertain to a stroke on the left side of a boat (for example using a single bladed paddle) and a right trajectory may pertain to a stroke on the right side of the boat. Optionally, when left and right trajectories are nearly symmetric, the stroke may be recognized 666a as a forward power stroke. Optionally, when under calm water and weather conditions the left and right trajectories are not symmetric, for example, there is repetition of left or right strokes; and/or when the strokes on one side are further from the kayak than the strokes on the other side than a sweep stroke may be recognized 666b.

In some embodiments, there may optionally be different tests for expert and novice paddlers. In the exemplary embodiment, when paddler 40 listed himself as a novice in the input 552 and/or when the coefficient of variation of the stroke length ($CV_L$) is greater than 0.2 then paddler 40 may be classified 669 as a novice.

Figure 8:
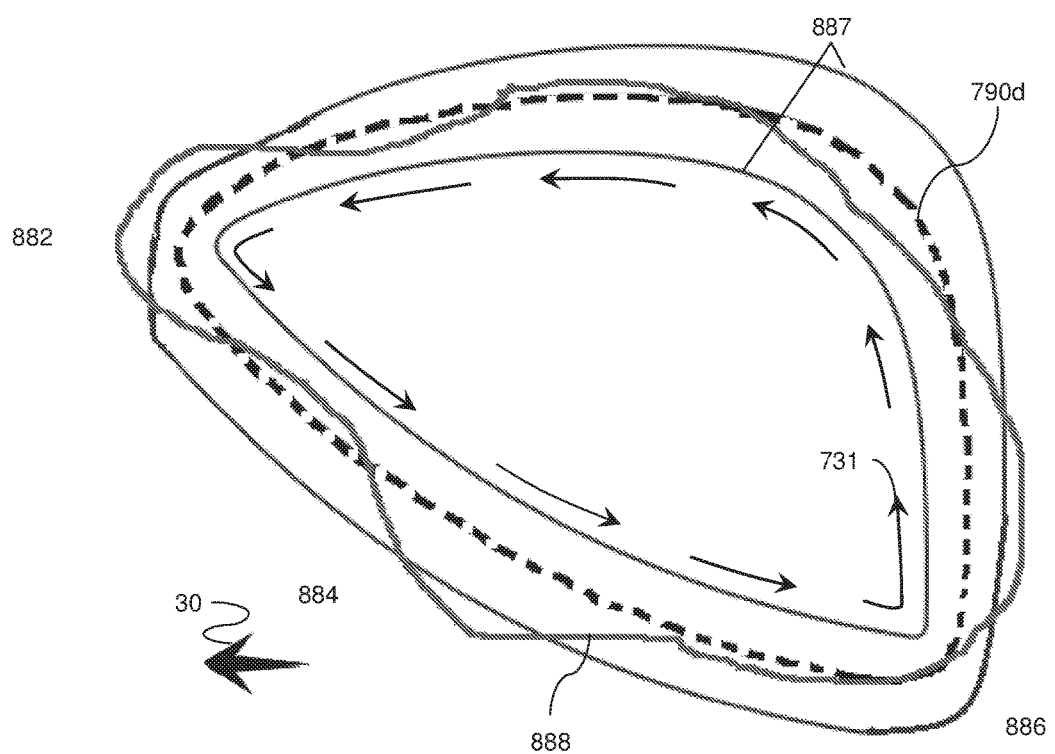
FIG. 8 is an enlarged illustration of a side view of the trajectory of a paddle stroke relative to the kayak.

Discerning 670a a trajectory may include various optional tests. In the exemplary embodiment in the case of a novice paddler performing a forward power stroke one or more of the following tests may be applied:
- the total time of the stroke may be compared to a preferred time (for example by subtracting the preferred time "dt" from the time difference between a catch and the previous catch $|(t_e-t'_e)-dt|$ and normalizing), and/or
- the feathering angle "F" may be compared to the preferred feathering angle "$F_i$", and/or
- the coefficient of variation of the stroke length "$CV_L$" and/or timing "$CV_t$" may be compared to a maximum value, and/or
- the correspondence between the stroke shape and a preferred trajectory sleeve may be compared and a stroke correction applied when the path is less than for example 80% in the sleeve (as illustrated in FIG. 8 and the accompanying description), and/or
- the location the catch may be compared to a preferred paddling area; for example, the location, and/or the maximum depth of the stroke may be compared to a preferred location and/or depth.

In the example of FIG. 6, the error threshold in stroke timing may be 0.2. In such a case the stroke timing passes the test if $|(t_e-t'_e)-dt|/dt<0.2$. In some embodiments, for example the timing error threshold may range between 0.6 and 0.9.

An example of a preferred feathering angle may be perpendicular (90°) to the direction of flow (the x-axis in FIG. 1) and the feathering error threshold may be 0.15. In such a case the feathering angle F would be pass the test if the normalized feathering angle were less than $|F-F_i|/F_i<0.15$. In some embodiments, the preferred feathering angle error threshold may be between, 0.05 and 0.35 for example and the error threshold may range between 0.6 and 0.9.

In the example of FIG. 6 the threshold for coefficient of variation of stroke length is 0.3 (a stroke is found deficient if $CV_L \geq 0.3$). In some embodiments, the stroke length coefficient of variation threshold may range between 0.05 and 0.4.

In the example of FIG. 6 the threshold for coefficient of variation of stroke time is 0.2 (a stroke is found deficient if $CV_t \geq 0.2$). In some embodiments, the stroke timing coefficient of variation threshold may range between 0.05 and 0.3.

In the example of FIG. 6, the threshold for trajectory error is 0.8 (a stroke passes the test is if 80% of the trajectory is in the sleeve). In some embodiments, the trajectory error may range between 0.6 and 0.95.

In the exemplary embodiment, when the trajectory passes all of the tests, then paddler 40 is given an encouragement 672a message. Otherwise, appropriate advice is determined 674a for improving. For example, one or more of the following may be undertaken:
- when the maximum stroke depth is too shallow, then an oral message will optionally tell paddler 40 to lean more into his stroke;
- when the stroke timing is too short or uneven, LED 415a on module 41p will optionally blink yellow at the proper time for each catch to encourage him to return to the preferred cadence;
- when the feathering is improper, a message will optionally be shown on display 402 stating "face blade more directly against the water", and/or
- when the speed of kayak 42 is too slow to reach the desired destination in time (as input 552 in the itinerary) then a message will optionally be given to paddle more strongly; additionally or alternatively, a message will be given to the paddler stating the estimated arrival time.

Tests for discerning 670b trajectory of a paddling instrument and the strategies determined 674b for an expert paddler will optionally be the same as those for a novice paddler but have stricter thresholds (as illustrated in FIG. 6). Additionally or alternatively, there will optionally be different tests for an expert paddler and for a novice.

When the stroke is recognized 666b as a sweep stroke then various optional tests may be performed to discern 670c the sweep stroke trajectory. In some embodiments, appropriate strategies to improve the stroke will optionally be determined 674c or encouragement 672b will optionally be given to paddler 40. For example, tests and strategies for a proper sweep stroke could include one or more of the following:
- when the maximum y-location of the blade (relative to the kayak) during the sweep is less than for example 90% of the preferred maximum sweep y-location (PSYmx<(0.9)PSYsmx) then the paddler will optionally be told to sweep out further from the kayak;
- when the maximum y-location of the blade during the sweep is far greater than for example 110% of the preferred maximum sweep y-location (PSYmx>(1.1)PSYsmx) then the paddler will optionally be told to sweep closer to the kayak;

when the maximum y-location of the paddler's body during the sweep is less than for example 90% of the preferred maximum sweep y-location (BYmx<(0.9) BYsmx) then the paddler will optionally be told to lean further during the sweep stroke;

when the maximum y-location of the paddler's body during the sweep is greater than for example 110% of the preferred maximum sweep y-location (BYmx>(1.1) BYsmx) then the paddler will optionally be told to lean less while sweeping, and/or when the change in pitch of the kayak is less than for example 80% of the expected change ($AK_{xy}$<$0.8AKS_{xy}$) then the paddler will optionally be told that his sweep stroke is not working and/or the system will optionally employ advanced analysis to try to find the cause.

In the example, the maximum and minimum thresholds for the sweeping stroke y-location errors are 1.1 and 0.9. In some embodiments, maximum threshold may range from 1.05-1.25, and the minimum from 0.75-0.95.

In the example maximum and minimum threshold body motion during sweeping stroke y-location errors are 1.1 and 0.9. In some embodiments, the maximum threshold may range from 1.05-1.25 and the minimum from 0.75-0.95.

The analysis of paddling trajectory will optionally use Boolean or weighted algebraic statements. For example a correction may be signaled when two conditions are both true (Boolean "and") or when either of two conditions are true (Boolean "or"). Additionally or alternatively, a threshold for a weighted sum of two parameters may signal a problem in paddling (for example for the normalized stroke length error |L−$L_s$|/$L_s$ (where L is the measured stroke length and $L_s$ the preferred stroke length) the correction may be signaled when for example 70% of the normalized stroke length error added to 30% of the normalized timing error is greater the 0.2 (0.7|L−$L_s$|/$L_s$+0.3|($\underline{t_e}$−$\underline{t'_e}$)−dt|/dt>0.2).

Characterizing a Trajectory by a Sleeve of Preferred Movement

One optional way of characterizing a stroke is by distinguishing conformance of the measured trajectory to a model trajectory and/or a preferred sleeve of movement. Particularly, the actual shape of a stroke (and/or an average of a few strokes) will optionally be compared to a preferred stroke and/or a sleeve of preferred trajectory. When the portion of the stroke that falls outside of the sleeve is too large (for example greater than 20%) the stroke will optionally be deemed deficient. The location and geometry of the deficient portion of the stroke will optionally be used to determine a strategy to improve the stroke.

Figure 7:
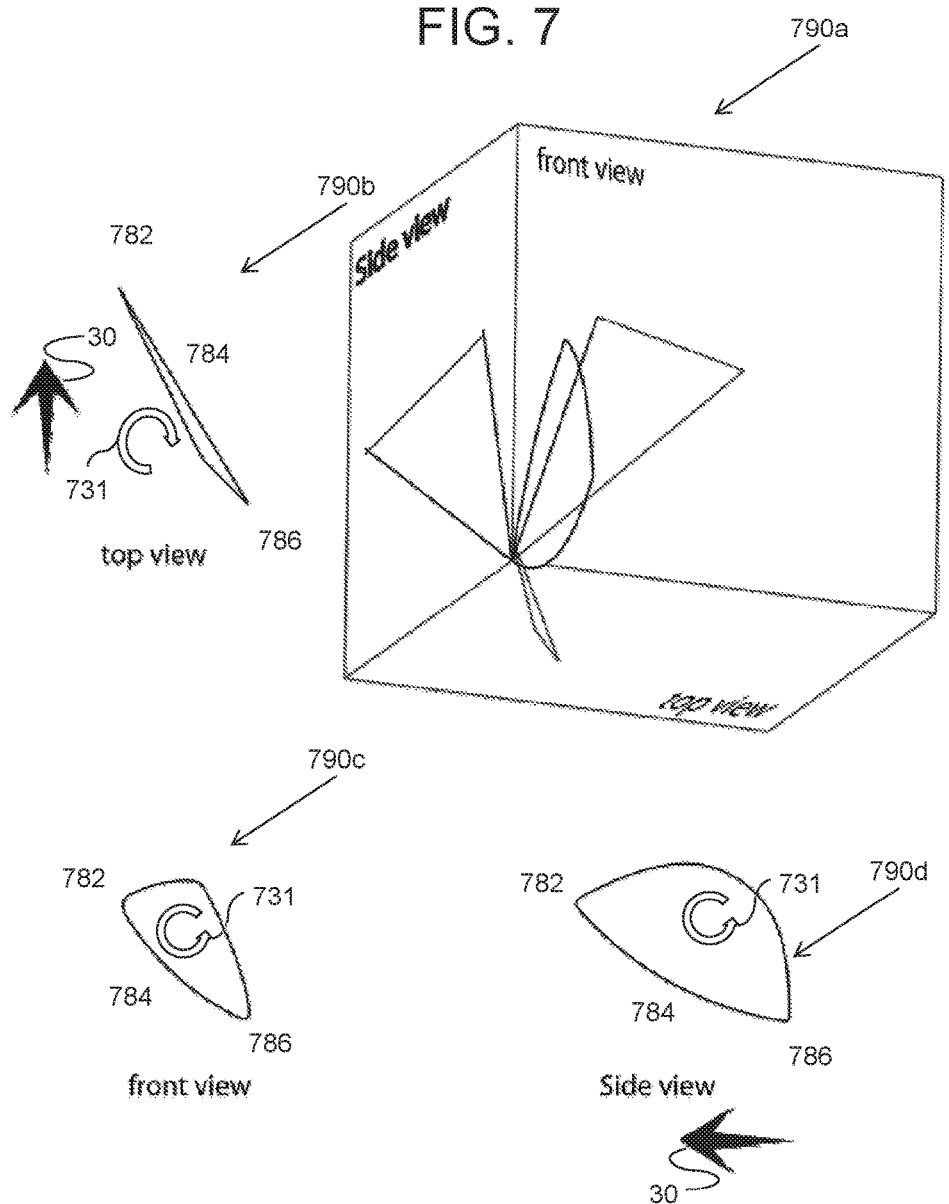
FIG. 7 is a three dimensional illustration of a paddling stroke trajectory relative to a kayak.

FIG. 7 illustrates a three-dimensional view 790*a*, a top view 790*b*, a front view 790*c*, and a side view 790*d* of an example of a preferred model blade trajectory relative to a kayak. Curved arrows 731 illustrate the direction of movement of the blade. Arrow 30 illustrates the direction of movement of the kayak. The location of the catch 782 the drive 784 and the finish 786 are also marked.

FIG. 8 illustrates is an enlarged side view of the exemplary blade trajectory relative to the kayak. The dotted lines are the side view 790*d* of a preferred stroke. The smooth black lines are the boundaries 887 of a preferred trajectory sleeve. The crooked line represents an actual stroke 888. Also illustrated are the locations of a catch 882, a drive 884 and a finish 886.

It can be seen that stroke 888 is about 85% inside the preferred sleeve. In the example of FIG. 6 above this would be considered an acceptable stroke for a novice (path>80%) but for an expert a search would be made to determine 674*b* an improvement strategy. For example, in FIG. 8 that catch 882 is to far forward, drive 884 is too deep and finish 886 is too far backwards. In the example, the paddler will optionally be advised to shorten his stroke.

Calculating the Force on a Blade

The force on a paddling instrument will optionally be calculated from the shape of the blade and its velocity against the water. For example one simple but rough estimate that is commonly used is that Force $F(Kg\ m\ s^{-2})$=A (Area $m^2$)×K×$v^2$ (Velocity m/sec)×ρ(Water density $Kg/m^3$)/2 where F is the force of the paddle, K is a constant drag coefficient, ρ is the density of the water, A is the surface area of the paddle blade pushing against the water, and v is the velocity difference between the paddle and the water (see Wastewater Engineering Treatment, Disposal and Reuse, by George Tchobanogous and Franklin L. Burton, McGrawHill Inc. NY, $2^{nd}$ edition 1979 pg. 218). The value of K will generally be calibrated, but a rough value of 1.8 is can be used. The velocity of the paddle blade will optionally be calculated from the measured linear and angular velocity of the shaft by integrating over time. The speed of the water currents will optionally be supplied in input 552 and/or additionally or alternatively, the speed of water currents will optionally be known from external sources and/or estimated by calibration 554.

Personal Monitoring

An individual exerciser and/or a paddler and/or a coach may optionally use the system of the current invention for monitoring the status of one or more of training and/or physical exertion and/or paddling technique.

For example, the system may collect data for an individual paddler and/or a paddling team on one or more of the following:

the power of rowing and/or paddling (for example in watts);

stamina (for example changes in power over time and/or changes of maximum paddling force over time and/or changes in paddling rate over time);

rowing and/or paddling cycles;

rowing and/or paddling tempo; and/or two-side synchronization

The data may optionally be stored locally and/or remotely. The data may be presented to the paddler and/or a coach and/or sports fans. The data may be presented live and/or at a later time.

Navigation

In kayaking, navigation may be an important issue. For example, in sea kayaking unbalanced left and right strokes can cause a kayak to travel on a curved path, wasting energy and making navigation very difficult. In an optional embodiment, a paddling coaching and/or monitoring system may optionally collect and/or present status and/or navigational data to a paddler.

In some embodiments, the system may also present environmental data to the paddler and/or others. Environmental data may include for example one or more of the following:

route, map;

currents;

sun movement;

moon movement;

estimated time of arrival;

distance to a goal;

distance traveled;

tide cycles, and/or weather.

The application optionally monitors physiological signs of a paddler. For example, it may monitor the heart beat rate of a rower.

Optionally the paddling coaching and monitoring system may analyze paddling techniques that are pertinent to navigation. For example, the system may optionally compare left and right blade trajectories and/or stroke balance.

Optionally the paddling coaching and monitoring system may tell the rower whether he is on or off course and additionally or alternatively it may recommend how to reposition the paddle or adjust the strokes to improve efficiency and/or to keep to the trip itinerary and/or to keep the kayak traveling in a straight line. For example, when the left and right strokes are unbalanced the paddler may be told to shift his grip on the paddle and/or to lean more toward the side of the weak stroke.

Rowing Teams

Some embodiments of a paddling coaching and/or monitoring system track multiple individual paddlers and/or rowers and/or their coordination. This can be of value for example when coordinating a rowing team.

In some embodiments, a paddle coaching and/or monitoring system will optionally track various performance aspects of multiple paddles. For example, the system may track some or all of the following:

stroke length;
power versus stroke rate;
stamina;
portion of strokes that fit a preferred pattern (for example how closely a rowers keeps a required tempo or how often a paddler's stroke leaves a preferred area)
maximum power, and/or
normal power.

Optionally the data may be tracked for either or both right and left side together or separately. The data will optionally be tracked when the paddlers are paddling together and/or when each one is paddling on his own.

In some embodiments, the system will present the information in a format to assist a coach choosing team members. For example, the coach may be allowed to choose a hypothetical team and the system will give output performance predictions. For example, performance predictions may include one or all of a maximum expected power as a function of rowing cadence and/or time and/or distance traveled, an expected synchronization efficiency, and/or a weight balance. Predictions may be presented for both sides of the boat together and/or for each side separately and/or include a comparison between the left and right.

Additionally or alternatively, the system may make suggestions of good team match ups optimizing various performance characteristics.

Additionally or alternatively, the system may track performance of a team as a whole. For example, the system may optionally integrate performance measures of members of a rowing of the team and/or the team as a whole and/or performance measures (for example boat speed, acceleration, and/or how closely a boat keeps to a chosen path and/or itinerary). In some embodiments, the system may track one or more of the following:

effort and/or remaining stamina of paddlers;
mistakes of individual paddlers;
mistakes of the team, and/or
timing and/or coordination.

In some embodiments, data will be output in real time to a coach on shore or in a coaching boat and/or to individual paddlers. This may help sharpen performance and/or training and/or be presented live to sports fans. Additionally or alternatively, data may be stored and may be available off line. Offline data may be used for coaching and planning of training regimes. Offline data may also be published for sports fans.

For example, during training or competition, a paddle coaching and/or monitoring system can be used track timing and effort of each paddler separately and of the team as a whole. Then, if a paddler is off timing or is working harder than his teammates (and likely to fatigue faster as well) he is optionally informed of an improved rowing strategy (change the rate, change the form). Furthermore, the team as a whole may optionally be instructed to save energy for the finish, or to work harder, or to change the cadence or to change the paddling trajectory.

It is expected that during the life of a patent maturing from this application many relevant technologies will be developed and the scope of the terms is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A method for monitoring paddling with a paddle movement sensor mounted onto a paddling instrument, said method comprising:
   (a) collecting data from a paddling instrument while the paddling instrument is being used for paddling on the left side of a boat and on the right side of a boat;
   (b) generating an indication of changes in position and changes in orientation of said paddling instrument with the same paddle movement sensor;
   (c) measuring a position of a water surface based on said indication and
   (d) tracking by a processor using data from said same movement sensor a spatial trajectory of a blade of said paddling instrument when paddling on the right side of said boat and when paddling on the left side of said boat, including tracking a height of said blade below said position of said water surface from said indication.

2. The method of claim 1, wherein said tracking includes distinguishing by said processor a balance between the trajectory of said blade when said paddling instrument is used on the right side of the boat and the trajectory of said blade when said paddling instrument is used on the left side of the boat.

3. The method of claim 2, further comprising:
   (e) determining by said processor a paddling improvement strategy corresponding to said balance and wherein said paddling improvement strategy includes guidance for leaning.

4. The method of claim 1, further comprising:
   (e) determining by said processor a paddling improvement strategy corresponding to at least one of the trajectory of the right side and the trajectory of the left side.

5. The method of claim 4, wherein said trajectory includes a three dimensional shape of a stroke, the method further comprising:
   (e) recognizing by said processor a stroke kind from said trajectory and wherein said determining is different for different kinds of strokes.

6. The method of claim 4, wherein said determining includes determining a strategy to reduce a wobble in a pitch angle of a boat.

7. The method of claim 4, wherein said determining includes determining a strategy to reduce a wobble in a yawing angle of a boat.

8. The method of claim 1, wherein said trajectory on at least one of said right side and said left side is also with respect to a paddler.

9. The method of claim 1, further comprising:
   (e) tracking by said processor a trajectory of said boat,
   (f) computing by said processor a relative trajectory of said blade with respect to said boat based on said trajectory of said boat and said trajectory of said blade.

10. The method of claim 1, further comprising:
    (e) delineating a preferred paddling area, and
    (f) distinguishing by said processor a conformance of said trajectory to said preferred paddling area.

11. The method of claim 1, further comprising:
    (e) calculating by said processor a force on said blade based on said trajectory.

12. The method of claim 1, wherein said monitoring is for a plurality of paddlers of a team said method further comprising:
    (e) calculating a synchronization efficiency for said plurality of paddlers based on said monitoring.

13. The method of claim 1, further comprising:
    (e) measuring an outcome of the paddling on a trajectory of a boat, and
    (f) determining by said processor a paddling improvement by comparing said outcome to said trajectory of said paddling instrument.

14. The method of claim 1, further comprising:
    (e) detecting of use by a paddler of an inefficient technique corresponding to at least one of said right side trajectory and said left side trajectory.

15. The method of claim 1, further comprising:
    (e) detecting, from said changes, at least one event selected from said blade entering the water and said blade exiting the water on at least one of said right side of the boat and said left side of the boat; and
    (f) calibrating said sensor based on a position of the paddle
    with said blade of the paddle touching the water surface.

16. The method of claim 1, wherein said sensor is mounted to a shaft of the paddling instrument.

17. The method according to claim 1, wherein said paddling instrument is two-bladed.

18. The method according to claim 17, wherein said paddle movement sensor is mounted onto a respective center of a shaft of said paddling instrument.

19. The method according to claim 18, wherein data from said movement sensor is used for tracking a location of the center of said paddling instrument for estimating one or both of a mean stroke length and a speed of the boat.

20. A monitoring system comprising:
    (a) a sensor configured for mounting to a paddling instrument; said same sensor configured for indicating changes in both position and orientation of said paddling instrument when paddling on the right side of the boat and when paddling on the left side of the boat, and
    (b) a processor configured for
       receiving an output from said sensor,
       estimating a location of a water surface from said output and
       tracking, using data from said same movement sensor, a spatial trajectory of a blade of said paddling instrument when paddling on the right side of the boat and when paddling on the left side of the boat, including a height of said blade below said water surface from said output of said sensor.

21. The system of claim 20, wherein said processor is further configured for determining a paddling improvement strategy, the system further comprising:
    (c) an output device configured for recommending said paddling improvement strategy to a paddler.

22. The system of claim 20, further comprising:
    (c) a boat mounted sensor module indicating changes in position and changes in orientation of said boat and wherein said processor is further configured for computing a trajectory of said boat and said spatial trajectory of said blade with respect to said boat.

23. The system of claim 20, wherein said processor is further configured for comparing a trajectory of said blade when said paddling instrument is used on said left side of the boat to a trajectory of said blade when said paddling instrument is used on said right side of the boat.

24. The system of claim 20, wherein said paddling instrument is not restricted by a fixed pivot.

25. The system of claim 20, further comprising:
(c) a boat mounted sensor module indicating changes in position and changes in orientation and wherein said processor is further configured for calculating a force on said blade of said paddling instrument, when used on at least one of the right side of the boat and the left side of the boat, based on said spatial trajectory of said blade and determining an acceleration of said boat from an output of said boat mounted sensor, and
(d) adjusting calibration of a water condition based on an agreement of said determining and said calculating.

26. The system according to claim 20, wherein said processor is further configured for comparing a trajectory of said blade when said paddling instrument is used on said left side of the boat to a trajectory of said blade when said paddling instrument is used on said right side of the boat.

27. The system according to claim 20, wherein said paddling instrument is two-bladed.

28. The system according to claim 27, wherein said paddle movement sensor is mounted onto a respective center of a shaft of said paddling instrument.

29. The system according to claim 20, wherein said movement sensor is strapped onto a shaft of said paddling instrument by a loop.

* * * * *